March 29, 1932.                O. H. BANKER                1,851,146
                            AUTOMATIC CLUTCH
                          Filed March 20, 1930

INVENTOR.
Oscar H. Banker
BY
Quarles & French
ATTORNEYS

Patented Mar. 29, 1932

1,851,146

UNITED STATES PATENT OFFICE

OSCAR H. BANKER, OF PHILADELPHIA, PENNSYLVANIA, ASSIGNOR TO CONTINENTAL ILLINOIS BANK & TRUST COMPANY, OF CHICAGO, ILLINOIS, A CORPORATION OF ILLINOIS, AS TRUSTEE

AUTOMATIC CLUTCH

Application filed March 20, 1930. Serial No. 437,452.

The invention relates to automatic clutches. In many types of power transmission it is desirable to eliminate the necessity for manual operation of the clutch elements and to provide for an automatic clutching engagement between the drive and driven members. Centrifugally-operated automatic clutches of various kinds have been proposed for this purpose. Most of these clutches depend merely upon a frictional engagement between the clutch elements, but in order that such clutches should be fully effective to provide for efficient operating conditions means should be provided for effecting a positive driving engagement after the driving member has attained a predetermined speed and to make such positive drive engagement practical provision should be made for effecting the positive engagement only at a time when the speed of the driven member is nearly equal to that of the driver. The object of the present invention is to provide an automatic clutch mechanism which embodies the above-mentioned desirable qualities and more particularly to provide a clutch member wherein centrifugally-operated clutch elements between the drive and driven member first act to establish a frictionally clutched driving engagement between said members and thereafter centrifugally-operated clutch elements carried by the first set of clutch elements are permitted to come into action and establish a positive driven connection between the drive and driven members.

A further object of the invention is to provide an automatic clutch of very compact construction wherein centrifugally-operated clutch elements between the drive and driven members first act to establish a frictionally clutched driving engagement between said members and thereafter centrifugally-operated clutch elements mounted in said first-named clutch elements are permitted to come into action and establish a positive drive connection through the first clutch elements between the drive and driven members.

The invention further consists in the several features hereinafter set forth and more particularly defined by claims at the conclusion hereof.

In the drawings Fig. 1 is a sectional view through a clutch embodying the invention, taken on the line 1—1 of Fig. 2;

Figure 1:
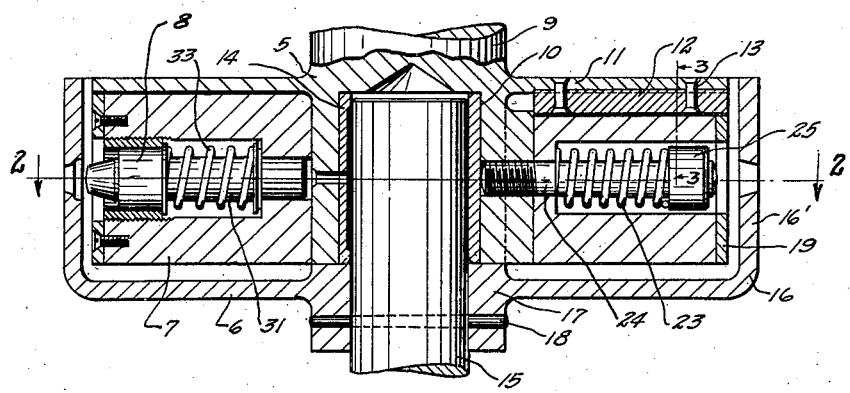
Figure 2:
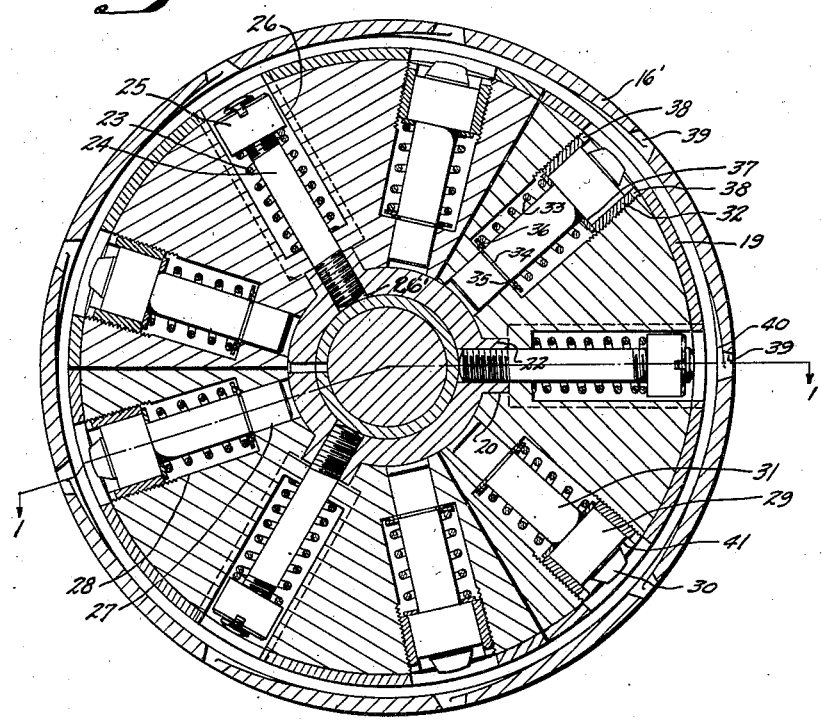
Fig. 2 is a sectional view taken on the broken line 2—2 of Fig. 1.

Referring to the drawings, the numeral 5 designates the drive member, 6 the driven member, 7 a plurality of centrifugally operated, frictionally engageable clutch elements and 8 a plurality of positively engageable clutch elements.

The drive member 5 has a shaft portion 9 provided with a front bore 10 and a flange 11 provided with radially disposed ribs or guides 12 secured thereto by rivets 13, the bore 10 being lined with a bearing bushing 14.

The driven member 6 is formed by the shaft 15 and the flanged drum 16, whose hub 17 is secured by a pin 18 or in other suitable manner to the shaft 15, whose inner end is journalled in the bearing 14.

Figure 3:
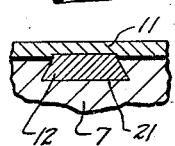
Fig. 3 is a detail sectional view taken on the line 3—3 of Fig. 1.

The clutch elements 7 are preferably in the form of sector-shaped weights or shoes, whose outer surfaces are provided with a suitable renewable facing or lining 19 adapted to contact with the flange 16' of the drum 16. Each clutch element has a radially extending guide groove 21 formed therein to receive one of the guides 12 and from Fig. 3 it will be noted that a dove-tailed sliding connection is provided whereby the driving strains between the driver and the weights are efficiently handled. In addition to these guides, each clutch element is provided with a radially disposed, transversely extending recess 20 and the inner end of the shaft 9 is provided with a radially disposed rib or key 22 working in this recess and serving to keep the clutch elements in proper alinement during operation.

The clutch elements 7 are spaced from each other a distance to effect the desired radial outward movement of said elements to clutched position.

Outward movement of each clutch element is resisted by a spring 23 surrounding a rod or stud 24 having threaded engagement at its inner end with the central portion of the rib 22 and carrying a tension-adjusting nut 25 at its other end, said rod, spring and nut, for each clutch element, being mounted in a cylindrical recess or bore 26 in that element with the lower end of said spring seated on the inner end of the bore, said rod also extending through an opening 26' in said clutch element concentric with said bore, each clutch element being free to slide on its spring-supporting rod 24. Thus, when the speed of the driver 5 attains a certain predetermined value these weights or clutch elements 7, under the action of centrifugal force, overcome the resistance of the springs 23 and move radially outwardly to bring their lined outer peripheries into contact with the inner side of the flange 16' of the drum 16 and when the pressure of this contact becomes great enough to overcome the inertia or forces tending to prevent rotation of the driven member 6, said member will, through these clutch elements, be driven by the drive member 5.

Each of the clutch elements 7 is provided with a plurality of sets of concentric bores 28 and 27 in each of which one of the clutch elements 8 is mounted. Each clutch element 8 is in the form of a plunger having a cylindrical head 29 provided with a conically formed outer end 30 and a round stem 31. The outer end of the bore 28 is threaded to adjustably receive a threaded sleeve 32 within which the head 29 is slidably mounted while the stem 31 is slidably mounted in the bore 27. These plungers provide weights which are moved outwardly by centrifugal force under the action of the drive member. These weights would naturally move with the first clutch elements 7 until said elements 7 stopped their movement, but in order that the independent outward movement of the elements 8 may not take place until after a relatively firm clutch engagement of the elements 7 has taken place this outward movement of said weights is resisted in each instance by a spring 33 interposed between the plunger and the clutch element in which it is mounted. For this purpose the stem 31 of the plunger is provided with an annular groove 34 in which a split ring 35, forming an annular shoulder, is mounted and against which a washer or ring 36, forming a seat for one end of the spring 33, is seated. The other end of the spring 33 is seated against a seating ring 37 which is seated against the sleeve 32, said sleeve being provided with spanner-wrench-engaging notches 38, whereby said sleeve may be turned to adjust the tension of the spring 33 and thus, if desired, increase its tension over the adjustment shown in the drawings, it being noted that the bottom shoulder of the head does not necessarily abut against the ring 37. The tension of the springs 33 is normally such that outward movement of the elements 8 will be resisted by the springs until a good contact between the frictional clutch elements 7 and the driven member 6 is obtained. It is also to be noted that the heads 29 of these elements have the greatest mass and are disposed close to the outer periphery of the revolving clutch elements 7.

The drum 16 is provided with a plurality of radially disposed recesses or openings 39 spaced to aline with the ends 30 of the elements 8 and arcuate recesses 40 formed in said drum on the approaching side of its normal rotation communicate with said openings 39 so as to permit the ready entrance of the pin end 30 into said recesses when the speed of the assembly is such that the weights or clutch elements 8 are moved outwardly relative to the elements 7.

Thus, with this construction, after the clutch elements 7 have, under the action of centrifugal force, been moved into frictional, clutched engagement with the drum 16, further increase in speed causes the clutch elements 8 to move radially outwardly and since the frictional engagement permits relative rotational movement of the clutch elements 7 and the drum, if the clutch elements 8 are not then in a position to permit their ends 30 to enter the openings 39, this relative rotational movement will soon bring them to a position where they can so enter and when they do, a positive clutching engagement between the drive and driven members will be established through the connection of said drive member with said driven member by the clutch elements 7 and 8.

On a decrease in speed below a predetermined value, the springs 33 will move the elements 8 out of clutch engagement with the drum 16 and on a further decrease in speed to a lower value the springs 23 will move the elements 7 out of frictional, clutched engagement with said drum.

The heads 29 at the base of the pin ends 30 have a relatively wide surface 41 and this surface forms, in the present instance, a means for limiting the outward movement of each clutch element 8, since when the pin 30 is in one of the recesses 39 its outward movement is limited by the engagement of surface 41 with the flange 16' of the drum.

I desire it to be understood that this invention is not to be limited to any specific form or arrangement of parts except in so far as such limitations are included in the claims.

What I claim as my invention is:

1. The combination of a driven member, a driving member, centrifugally operable clutch elements for frictionally, drivingly connecting said members together, and centrifugally operable clutch elements carried by said first-named clutch elements and operable after frictional engagement of the same for positively connecting said members together.

2. The combination of a driven member, a driving member, centrifugally operable clutch elements for frictionally, drivingly connecting said members together, means for resisting the movement of said clutch elements to clutched position, clutch elements carried by said first-named clutch elements and operable after frictional engagement of the same for positively connecting said members together, and means for resisting the movement of said second-named clutch elements, said last-named means having a greater resistance force than the first-named resisting means in proportion to the masses of the respective clutch elements.

3. The combination of a driven member, a driving member, centrifugally operable clutch elements for frictionally, drivingly connecting said members together, and centrifugally-operable clutch elements mounted in said first-named clutch elements and moving with the same and operable after frictional engagement of the same for positively connecting said members together.

4. The combination of a driven member, a driving member provided with radially disposed guides, clutch weights slidably mounted on said guides and having faces movable into frictional, clutched engagement with said driven member, and clutch weights mounted in said first-named weights and radially movable outwardly under the action of centrifugal force after said first-named weights are in clutched engagement with said driven member, said second-named weights having parts movable into positive driving connection with said driven member.

5. The combination of a driven member provided with a drum, a drive member provided with radially disposed guides, sector-shaped clutch members slidably mounted on said guides and having their arcuate faces movable into frictional contact with said drum, spring means resisting the outward movement of said clutch members until said drive member reaches a predetermined speed, weighted clutch members slidably mounted in said first-named clutch members and having pin ends, said drum having openings for receiving the ends of said last-named members for positive driving connection therewith, and spring means mounted in said first-named clutch members for resisting the outward movement of said second-named clutch members until said first-named clutch members have engaged the driving member.

6. The combination of a driven member provided with a drum, a drive member provided with radially disposed guides, sector-shaped clutch members slidably mounted on said guides and having their arcuate faces movable into frictional contact with said drum, spring means resisting the outward movement of said clutch members until said drive member reaches a predetermined speed, weighted clutch members slidably mounted in said first-named clutch members and having pin ends, said drum having openings for receiving the ends of said second-named clutch members for positive driving connection therewith and approach recesses leading to said openings, and spring means mounted in said first-named clutch members for resisting outward movement of said second named clutch members until said first-named clutch members have engaged the driving member.

7. The combination of a driven member provided with a drum, a drive member provided with radially disposed guides, sector-shaped clutch members slidably mounted on said guides and having their arcuate faces movable into frictional engagement with said drum, spring means resisting the outward movement of said clutch members until said drive member reaches a predetermined speed, weighted clutch pins slidably mounted in said first-named clutch members, said drum having openings to receive the ends of said pins for positive driving connection therewith, spring means for resisting the movement of said pins until said first-named clutch members have engaged the driving member, and means for limiting the outward movement of said pins.

In testimony whereof I affix my signature.

OSCAR H. BANKER.